(12) United States Patent
Chen et al.

(10) Patent No.: US 7,340,157 B2
(45) Date of Patent: Mar. 4, 2008

(54) PORTABLE TRANSCRIPTION DEVICE AND METHOD OF THE SAME PRIORITY

(75) Inventors: Chih-Yi Chen, Taipei Hsien (TW); Bei-Chuan Chen, Taipei Hsien (TW); Chao-Cheng Li, Taipei Hsien (TW); Mong-Ling Chiao, Taipei Hsien (TW); Nai-Jun Wang, Taipei Hsien (TW)

(73) Assignee: Apacer Technology, Taipei Hsien (TW)

( * ) Notice: Subject to any disclaimer, the term of this patent is extended or adjusted under 35 U.S.C. 154(b) by 983 days.

(21) Appl. No.: 10/436,083

(22) Filed: May 13, 2003

(65) Prior Publication Data

US 2004/0096200 A1 May 20, 2004

(30) Foreign Application Priority Data

Nov. 20, 2002 (TW) ............................... 91133878 A
Mar. 7, 2003 (TW) ............................... 92105425 A

(51) Int. Cl.
*H04N 5/76* (2006.01)
(52) U.S. Cl. .................... 386/125; 386/124; 348/231.1; 348/231.2
(58) Field of Classification Search ............. 348/220.1, 348/231.1–231.3, 231.8; 386/46, 117, 124, 386/125
See application file for complete search history.

(56) References Cited

U.S. PATENT DOCUMENTS

| | | | | |
|---|---|---|---|---|
| 6,020,982 A | * | 2/2000 | Yamauchi et al. | 358/444 |
| 6,137,642 A | * | 10/2000 | Inoue | 369/53.24 |
| 6,608,965 B1 | * | 8/2003 | Tobimatsu et al. | 386/52 |
| 6,987,927 B1 | * | 1/2006 | Battaglia et al. | 386/117 |
| 2002/0118949 A1 | | 8/2002 | Jones et al. | 386/68 |

FOREIGN PATENT DOCUMENTS

| | | |
|---|---|---|
| EP | 0 987 876 A2 | 3/2000 |
| EP | 1 126 462 A1 | 8/2001 |
| JP | 10-289557 | 10/1998 |
| JP | 2001-319410 A | 11/2001 |
| JP | 2001-346143 A | 12/2001 |
| JP | 2002-025182 A | 1/2002 |
| JP | 2002-330383 A | 11/2002 |
| TW | 090201833 | 2/2001 |
| WO | WO 92/22983 | * 12/1992 |
| WO | WO 02/063451 A1 | 8/2002 |

* cited by examiner

*Primary Examiner*—Thai Q. Tran
*Assistant Examiner*—Mishawn Dunn
(74) *Attorney, Agent, or Firm*—Pillsbury Winthrop Shaw Pittman, LLP

(57) ABSTRACT

A portable transcription device includes a reader module, a recording module, and a control module. The reader module is used to read data contained in a first storage medium of a first file system, and the recording module is used to record data into a second storage medium of the second file system. The control module includes a transcribing unit for transcribing data between the first file system and the second file system, and a MPEG encoder for encoding MPEG streams. Image files contained in a memory card inserted into the reader are MPEG-encoded, transcribed, and backup in a video disc ready for playback.

22 Claims, 8 Drawing Sheets

PORTABLE TRANSCRIPTION DEVICE AND METHOD OF THE SAME PRIORITY

The present invention claims the benefits of priority of Taiwan application NO. 091133878 filed on Nov. 20, 2002, and Taiwan application NO. 092105425 filed on Mar. 7, 2003.

FIELD OF THE INVENTION

The present invention is related to a portable transcription device, and more particularly to a portable transcription device possessing a high mobility and a surpassing capability of transcribing data among different file systems and recording the transcribed data in a storage medium.

BACKGROUND OF THE INVENTION

The portability of a computer peripheral device now has become an important factor in the research and design of a commercially available electronic device. Furthermore, the complexity and expansibility of computer readable file and software programs are gradually increasing. It is clearly that the conventional magnetic diskette is insufficient to keep record of computer readable data and software programs today. The emergence of a variety of portable storage media that are furnished with a large storage capacity and convenient maneuverability is appropriate for the replacement of the conventional magnetic diskette.

Up to now there have been proposed a great amount of solutions to straighten out the inconvenience caused by conventional magnetic diskette. In consideration of these solutions, flash memory is by far the most widely used recordable/rewritable memory component. The electric characteristics of a flash memory make it allowable to be programmed by virtue of the variation of an applied voltage to change the contents stored therein. Moreover, due to the advantages of a flash memory, e.g. small size, low power consumption and large storage capacity, it has been introduced into a variety of portable electronic products, for example, digital still camera, MP3 walkman, portable digital assistant (PDA) and so forth. The common categories of flash-based memory device include compact flash card (CF card), smart media card (SM card), and memory stick.

However, due to the stiff marketing price of a memory card, typically a user is used to backup or temporarily store the data contained in the memory card to other storage medium, in order that the memory card can be reused iteratively.

Based upon the foregoing reasons, a conventional measure for processing data is to use a card reader installed on a computer to read the data contained in a memory card, and then transcribe the data in order to be recorded in a hard disk drive fitted within the computer, a compact disc or other types of storage medium. If the storage capacity/marketing price ratio of a storage medium is to be taken into consideration, the most economical and favorable way is to use a compact disc recorder to record the desired data into a compact disc. Despite of the popularity and convenience of a compact disc, the operating method of a compact disc recorder is quite complicated and its utilization is not so facilitating for an awkward user as to produce enormous junk compact discs. In addition, when user desires to use a portable electronic device, such as a digital still camera in an outdoor environment, if there is no free space available in the memory card serving as the storage medium of the portable electronic device, the image data contained within the portable electronic device can not be transcribed and recorded in other storage media due to lack of a computer equipment. The portable electronic device can not be used any longer and thereby causes considerable inconvenience. Also, in a situation where the user needs to have the image data transformed into a slide show or a simple movie for immediate playback on a video disc player, he may have to have a computer nearby and perform necessary edittings using typical authoring software, which requires manual labour and sometimes leads to a waste of time.

SUMMARY OF THE INVENTION

It is therefore an object of the present invention to provide a standalone and portable transcription device for overcoming the above mentioned difficulties typical in conventional practices.

The portable transcription device according to the present invention is capable of transcribing the data contained in a first storage medium so as to be recorded in a second storage medium, and the file system used in the first storage medium is different in nature from the file system used in the second storage medium.

Accordingly, in a first preferred embodiment of the present invention, the portable transcription device of the present invention includes a control module, a reader module, and a recording module.

The control module includes a microcontroller, an inspection unit, and a transcribing unit. The microcontroller is used to receive data from the reader module, and the inspection unit is used to enable the microcontroller to check the available free space in the second storage medium. The transcribing unit is used to transcribe the data as represented within the file system in the first storage medium into the data as represented within the file system in the second storage medium.

The reader module is used to read data from the first storage medium and transmit the read data to the microcontroller. The recording module is used to receive the transcribed data from the transcribing unit and recorded the transcribed data into the second storage medium.

In a second embodiment of the present invention, the control module further comprises a image decoding unit, a motion stream generating unit, a video encoding unit, and a audio/video multiplexing unit. By the operation of these four additional units, the image files contained in the first storage medium are automatically editted and recorded into the second storage medium in a file format reday for playback in typical video disc players.

The advantages and features carried by the present invention can be best understood by the following preferred embodiment and accompanying drawings, in which:

DETAILED DESCRIPTION OF THE PREFERRED EMBODIMENTS

The examples and illustrations embodying the present invention will be manifested by the descriptions of the following preferred embodiment in reference to the drawings attached therewith.

Figure 1:
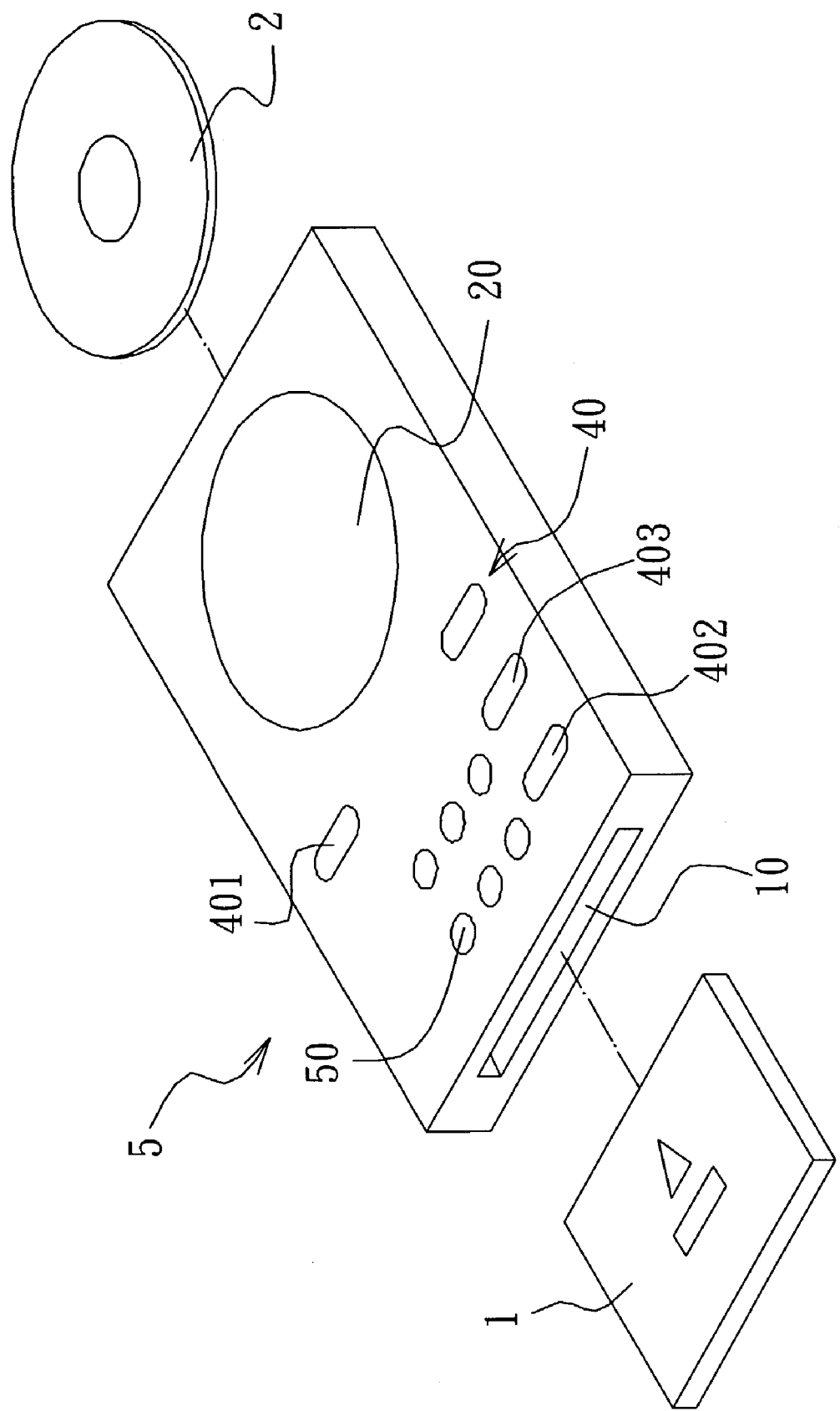
FIG. 1 is a three-dimensional exploded view showing a portable transcription device according to a preferred embodiment of the present invention.

Referring to FIG. 1, the portable transcription device 5 according to the present invention is capable of transcribing data contained in a first storage medium for the convenience of being recorded into a second storage medium. In the following preferred embodiment, the first storage medium referred throughout the present invention is directed to a nonvolatile storage medium, which includes but not limited to, a secure digital card (SD card), a multimedia card (MMC), a compact flash Card (CF card) type I, a compact flash Card type II, a microdrive manufactured by IBM corporation, a memory stick, a memory stick duo, a memory stick pro, a smart media card (SM card), an XD card and so forth. The second storage medium referred throughout the present invention is directed to an optical storage medium which is intended to be interpreted in a broadest definition, including recordable compact disc (CD-R), rewritable compact disc (CD-RW), DVD+R disc, DVD-R disc, DVD+RW disc, DVD-RW disc, DVD-RAM disc, DVD-dual layer disc, DVD-multi disc and so forth. However, it is to be realized that the first storage medium and the second storage medium referred herein are not exhaustively restricted to the forms listed above. Instead, the data storage mode and data access manner of the first storage medium and the second storage medium as described above can be exchanged. That is, the first storage medium can be directed to an optical storage device including the recordable/rewritable discs enumerated above, for example, while the second storage medium can be directed to a nonvolatile storage device including the possible memory cards enumerated above. On the other hand, the first storage medium and the second storage medium can be equipped with the same data storage mode and data access manner, but equipped with different data storage format and storage capacity. For example, the first storage medium can be directed to a recordable compact disc (CD-R) while the second storage medium can be directed to a DVD+RW disc. However, it is to be noted that the present invention can satisfy with the conditions mentioned above to transcribe the data contained in a first storage medium as represented within a file system used in the first storage medium into the data as represented within a file system used in a different second storage medium, irrespective of the type of the first storage medium and the second storage medium.

Figure 2:
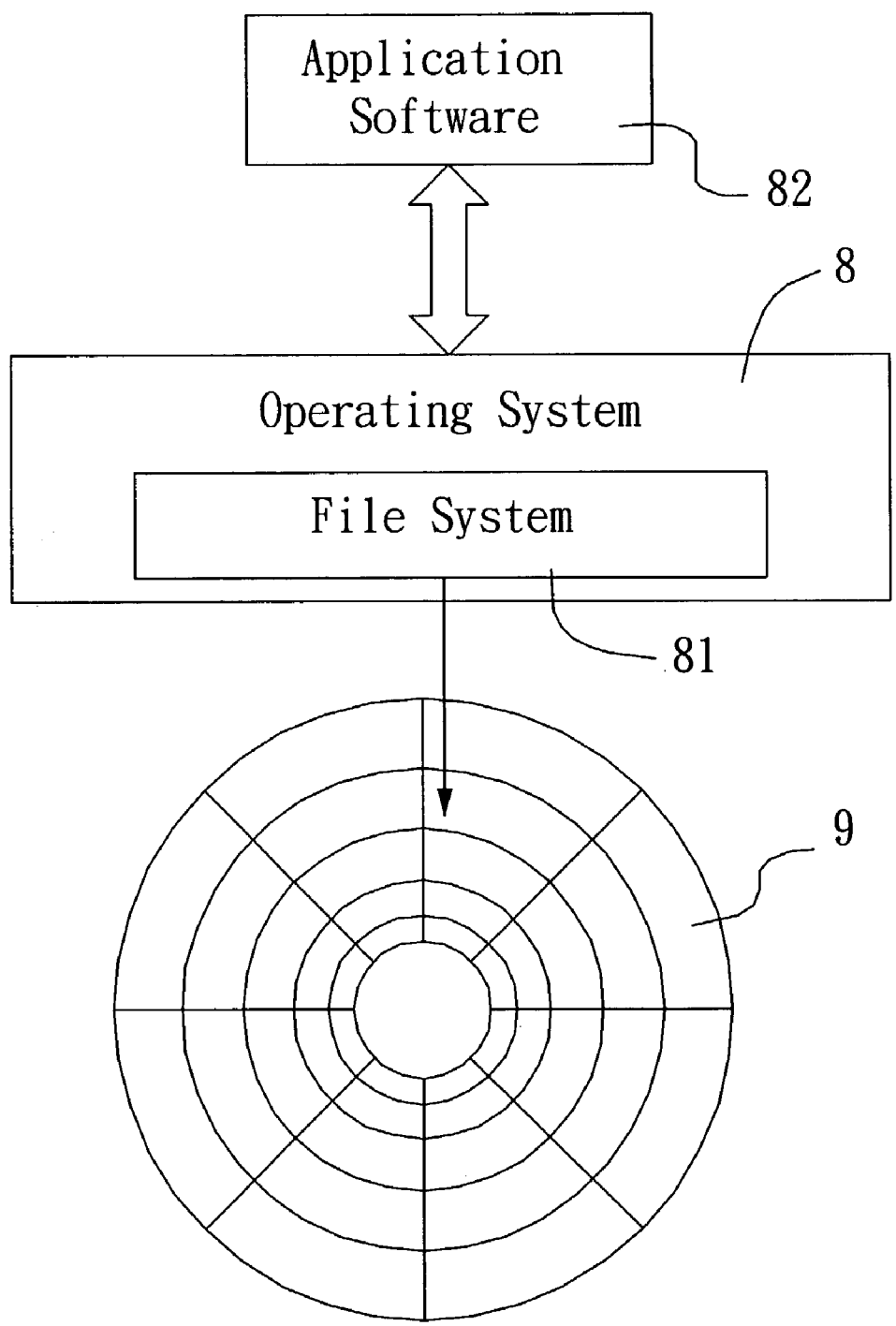
FIG. 2 is a plan view illustrating the relationships among the file system, operating system, and storage medium.

Referring to FIG. 2, as is well known in the art, different file systems 81 may be resident on different types of storage medium due to their compatibility with different operating systems or the prescriptions defined by different storage medium specifications. The file system 81 refereed herein indicates an interface between the operating system 8 and the storage medium 9. For example, when user is desired to request an access to read a file from the storage medium 9, the operating system 8 is capable of opening the required file in response to the request from the storage medium 9. This is because the file system 81 is able to keep track of the information concerning the physical locations of which the required files resides, the directory of which the required file belongs to, the designation of the required file and other related file structure information.

For example, DOS and Windows operating system family pioneered by Microsoft Corporation uses but not limited to FAT file system (including FAT 16 and FAT 32), UNIX operating system pioneered by Novell Corporation uses but not limited to UFS file system, Macintosh operating system pioneered by Apple Computer, Inc. uses but not limited to HFS file system. Because Windows operating system family pioneered by Microsoft Corporation has entered the mainstream of computer operating system, the contemporary memory card generally uses FAT file system as its file system to retain data and related system information.

On the other hand, currently there are provided a number of file storage standards for use by a compact disc, for example, ISO9660, Joliet, Romeo or UDF to serve as its file system. Unfortunately, the file system used in a compact disc is not exactly the same in the respects of file format and file structure with the file system used in a general computer system. In order to allow the user to access the data contained in a compact disc through an operating system, a transcription program capable of transcribing the data as represented within a file system format used by a compact disc into user the data as represented within a file system used by the operating system in each operating system, such that the data contained in a compact disc can be successfully accessed by a user through an operating system in a computer.

Figure 3:
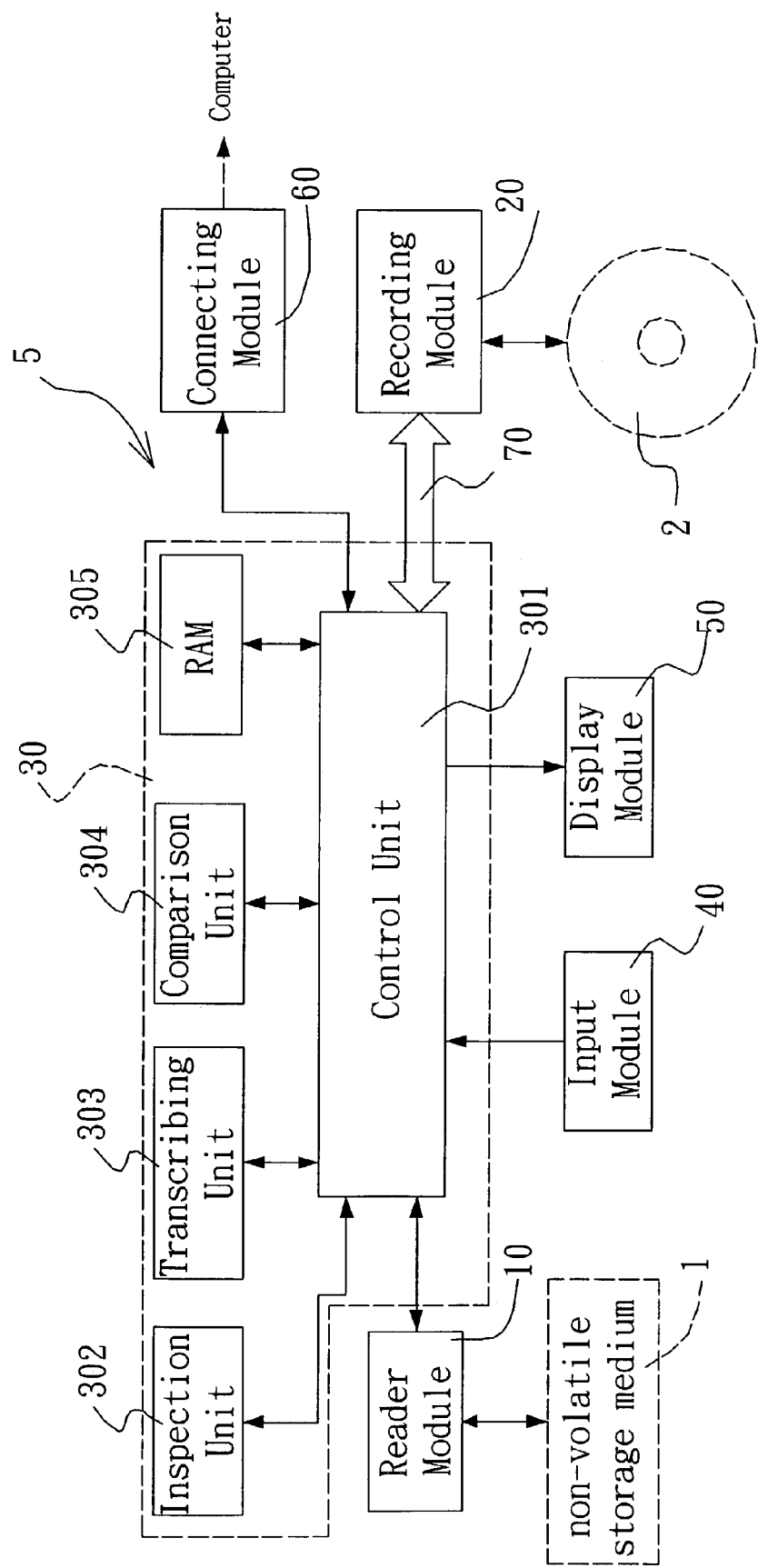
FIG. 3 is a systematic block diagram showing a circuit configuration of a portable transcription device according to a preferred embodiment of the present invention.

Referring to FIGS. 1 and 3, in the following preferred embodiment, the present invention provides a portable transcription device 5 operatively independent of the computer system and is capable of transcribing the data contained in a non-volatile storage medium 1 and recording the transcribed data into an optical storage medium 2. The portable transcription device 5 according to the present invention is comprised of a reader module 10, a recording module 20, a control module 30, an input module 40, and a display module 50.

The reader module 10 is used to access the data contained in the non-volatile storage medium 1. In this preferred embodiment, the reader module 10 is implemented by a memory card connector slot. As shown in FIG. 1, this memory card connector slot accommodates a receiving space for the non-volatile storage medium 1 to be received therein.

The recording module 20 is used to record data into the optical storage medium 2 or read the data contained in the optical storage medium 2, and is connected with a control unit 30 which will be described in greater detail hereinafter. In this preferred embodiment, the recording module 20 is directed to a compact disc recordable drive or a compact disc rewritable drive. It is certainly that the optical storage medium 2 has to be matched with the recording module 20. For example, if the recording module 20 is directed to a compact disc recordable drive, the optical storage medium 2 has be to selected as a recordable compact disc, and if the recording module 20 is directed to a compact disc rewritable drive, the optical storage medium 2 has be to selected as a rewritable compact disc.

The control module 30 is respectively connected with the reader module 10 and the recording module 20, and includes a control unit 301, an inspection unit 302, and a transcribing unit 303. The transcribing unit 303 and the inspection unit 302 are interconnected with the control unit 301. The control unit 301 in this preferred embodiment is directed to a microcontroller, such as an Intel 8086 microprocessor, and serves as the core of the portable transcription device of the present invention. The control unit 301 is competent to fetch and execute instructions, receive data from the reader module 10, and drive the recording module 20 to record data into the optical storage medium 2.

The inspection unit 302 is used to check the available free space in the optical storage medium 2. The purpose of the inspection unit 302 is to perceive the available free space in the optical storage medium 2 by virtue of a read disc information instruction (wherein its OP code is 51h) compiled in ATAPI/SCSI instruction set, and perceive the next writable address (NWA) on the optical storage medium 2 by virtue of a read check/rzone information instruction (wherein its OP code is 52h) also compiled in ATAPI/SCSI instruction set if data is contained on part of the optical storage medium 2 before the optical storage medium 2 is to be undergone a data recording process.

The transcribing unit 303 is used to transcribe the data contained in the non-volatile memory 1 as represented within the file system in the non-volatile storage medium 1 into the data as represented within the file system in the optical storage medium 2. As stated above, the non-volatile memory 1 takes the FAT file system to allocate files and directories. Consequently, an appropriate transformation for the file system is necessary when it is desired to transcribe the data contained in the non-volatile storage medium 1 so as to be recorded into the optical storage medium 2. In this preferred embodiment, for the purpose of allowing the transcribed data recorded in the optical storage medium 2 to be compatible with various kinds of operating systems, the ISO9660 file system defined by ISO9660 specification which is the most compatible file system with various optical storage media is selected as the file system used in the optical storage medium 2. The transcription process according to the present invention is as follows.

Figure 4:
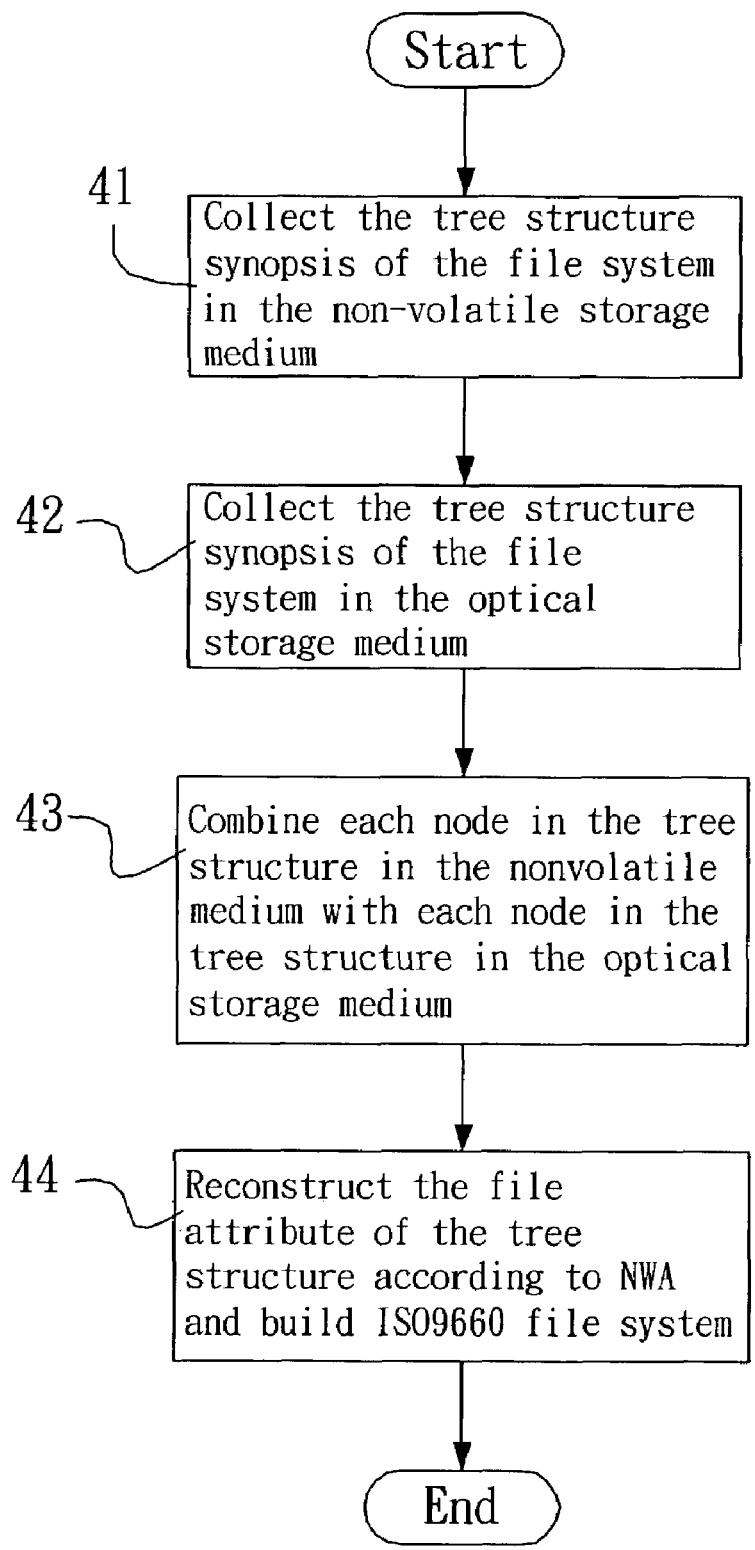
FIG. 4 is a flowchart diagram illustrating the procedural steps of data transcription between different file systems accomplished by a transcribing unit incorporated in the portable transcription device according to the present invention.

Referring to FIG. 4, the file structure synopsis of the FAT file system in the non-volatile storage medium 1 is collected by the reader module 10, as shown in step 41. That is, the reader module 10 grasps the files for which each cluster holds through the file allocation table (FAT) retained in the non-volatile storage medium 1, and acquire the information on the file tree structure constructed by root directory, file path and file names.

Step 42 is an optional step, which performs the collection of the synopsis of the file tree structure within the file system (such as ISO9660 file system) in the optical storage medium 2. If the optical storage medium 2 contains data before the transcription process starts, the inspection unit 302 is able to perceive the information related to ISO9660 file system in the optical storage medium 2. If there is no data contained in the optical storage medium 2, there will not exist any information related to the file system in the optical storage medium 2.

Eventually, at shown in steps 43 and 44, each node of the file tree structure in the non-volatile storage medium 1 is combined with each node of the file tree structure in the optical storage medium 2, and the attributes of the file tree structure are reconstructed according to a next writable address (NWA). In this way, an ISO9660 file system is built in the optical storage medium 2.

Besides, in order to avoid errors generated within data during transcription process, the control module 30 further includes a comparison unit 304. The comparison unit 304 is able to compare the original data contained in the non-volatile storage medium 1 with the transcribed data contained in the optical storage medium 2 to detect errors resulting from the transcription process.

It is to be explained here that the foregoing inspection unit 302, the transcribing unit 303 and the comparison unit 304 are presented in the form of firmware. That is, the inspection unit 203, the transcribing unit 303 and the comparison unit 304 are implemented in such a way by compiling programmable codes, implanting the compiled codes into a non-volatile memory, and then constituting a programmed read-only memory. In this manner, the control unit 301 can load the inspection unit 302, the transcribing unit 302 and the comparison unit 303 and put them into execution. It is certainly that the control module 30 may further include a random access memory (RAM) 305 that is accessible from the control unit 301, and thereby accelerate the progress of the transcription process.

The input module 40 can be directed to an operation panel and coupled with the control unit 301 for enabling the user to enter inputs to manipulate the portable transcription device according to the present invention. For the convenience of easy control on the portable transcription device, three functional pushbuttons are provided for the input module 40, wherein the first is a Power-On pushbutton 401, the second is a Recording (REC) pushbutton 402, and the third is a Recording/Check (REC/Check) 403.

The display module 50 is connected with the control unit 301 and is able to display status information related to data reading, recording, and comparison between the transcribed data and the original data, for example, status information indicating the operation power is on, the storage capacity of optical storage medium 2 is full, data recording is in progress and so on. In this preferred embodiment, in order to save cost and power consumption, the display module 50 is implemented by light-emitting diodes (LEDs). Under different conditions, LEDs corresponding to a specific event will be lightened or start blinking with light of different colors to notify the user of associated messages.

Besides, although the portable transcription device according to the present invention can operate independently of a computer, a preferred implementation is to accommodate the portable transcription device 5 of the present invention with a connecting module 60. The connecting module 60 is directed to a USB connector for interconnecting with the portable transcription device 5 with a computer according to the preferred embodiment. The purpose of the connecting module 60 is that if the first storage medium (non-volatile storage medium 1 in the preferred embodiment) uses the same file system with the operating system of a computer connected therewith, data contained in the first storage medium can be directly transferred into the hard disk dive fitted within the computer via the connecting module 60 without the requirement of data transcription. Such a configuration enables the portable transcription device 5 to serve as a card reader without effort.

Figure 5:
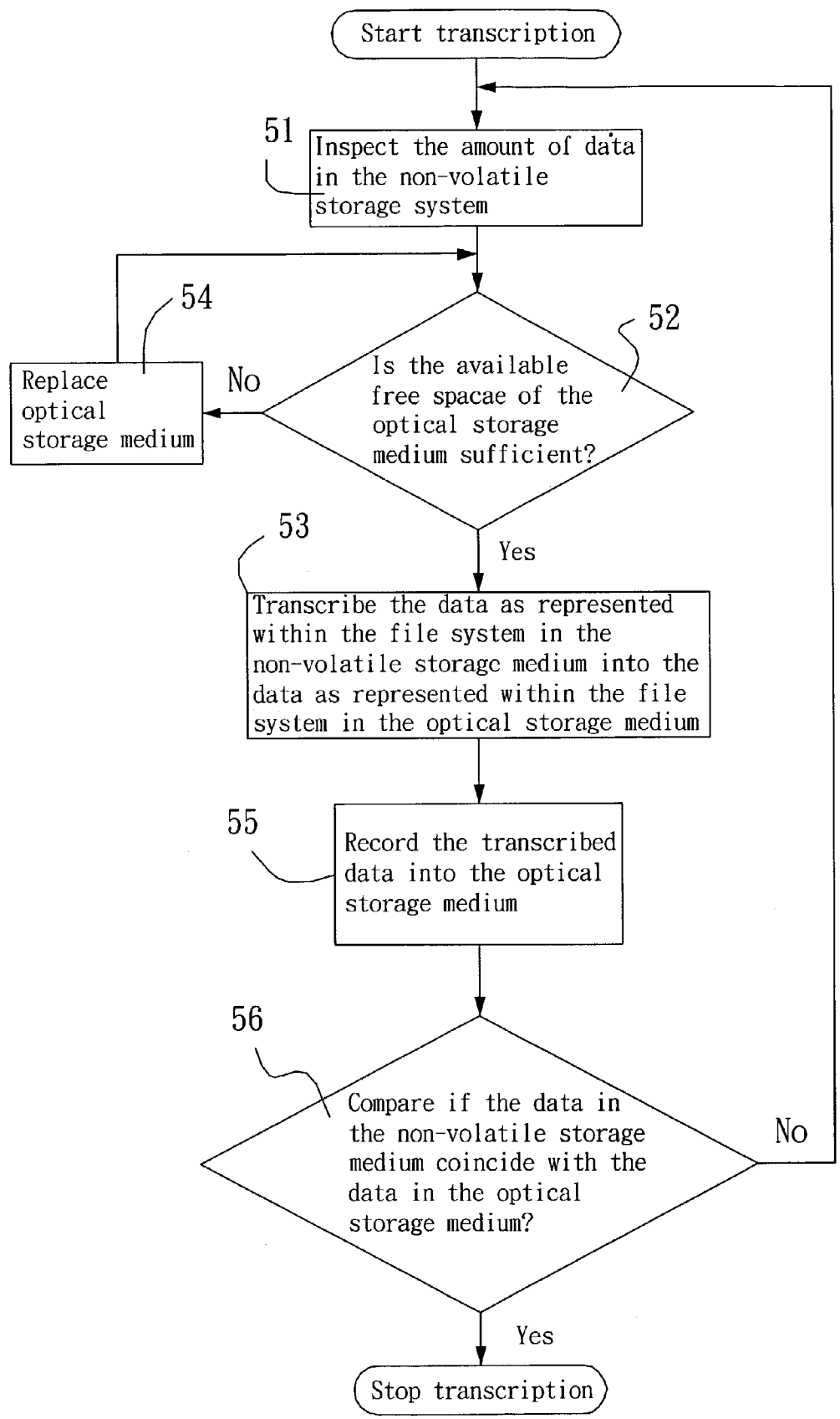
FIG. 5 is a flowchart diagram illustrating the procedural steps of data transcription process using a portable transcription device according to the present invention.

Referring to FIGS. 3 and 5, if the user intends to carry out transcription process, a non-volatile storage medium 1 and an optical storage medium 2 are provided in advance, and the control of the transcription process is accomplished by the input module 40 after the non-volatile storage medium 1 and the optical storage medium 2 are respectively placed into the reader module 10 and recording module 20. For example, as the user depresses the Recording/Check (REC/Check) 403, the control module 301 accesses the non-volatile storage medium 1 via the reader module 10 and perceives the data quantity contained in the non-volatile storage medium 1, as shown in step 51.

As shown in step 52, the inspection unit 302 inspects the optical storage medium 2 by the recording module 20, and determines whether the available free space in the optical storage medium 2 is larger than the data quantity contained in the non-volatile storage medium 1 by reading disc information, files and history record of directories, file allocating table, and next writable address (NWA). It is certainly that the operations associated with step 52 are implemented by loading multiple programmed codes constituting the inspection unit 302 into the control unit 301 and executes these codes in turn.

Next at step 53, if the available free space in the optical storage medium 2 is larger than the data quantity contained in the non-volatile storage medium 1, the file format of the non-volatile storage medium 1 is transcribed, i.e. the file as represented within FAT file system is transcribed into the file as represented within ISO 9660 file system. It is certainly that the file contents do not changed, the only changes made in the transcription process is the format of file header and file recording method. Because the transcription process has been fully described in the foregoing, it is not intended to make a detailed discussion in the following.

If the available free space in the optical storage medium 2 is less than the data quantity contained in the non-volatile storage medium 1, the optical storage medium 2 should be renewed and the following steps may continue, as indicated in step 54.

When the transcription process is completed, as indicated in step 55, the control unit 301 sends the transcribed data to the recording module 20, and then records the transcribed data into the second storage medium 2 by means of the recording module 20. It is to be stressed here that if the an optical storage medium is selected as the second storage medium, the recording module 20 records the transcribed data into the optical storage medium in a manner of multi-session. That is, the transcribed data as represented within ISO9660 file system including primary volume descriptor (PVD), Volume Descriptor Set Terminator (VDST), history record of file and directory, file allocating table and files will be sequentially recorded into the optical storage medium 2 starting from the next writable address. Finally, the close session operation, i.e. lead-out action which indicates that the end of the data has been reached will be performed to complete a session. If this session is not an initial session, the file system description of this session should contain the information related to the file allocations of the last session.

Data can be successively recorded in the new session following the previously recorded session at the next data recording task through the use of multi-session recording technique when there is free space available in the optical storage medium 2. In this manner, the storage space of the optical storage medium 2 can be fully utilized.

Eventually, as indicated in step 56, the control unit 301 accesses the comparison unit 304 to compare the data recorded in the optical storage medium 2 and the original data contained in the non-volatile storage medium 1. If no error is detected within the recorded data, the recording process for the transcribed data is accomplished. It should be expounded here that this step is also an optional step. If the user depresses recording pushbutton, steps 51, 52, 53 and 54 will be executed only while eliminating the step of data comparison in order to reduce the total data recording time.

It is to be understood that although the preferred embodiment disclosed hereinbefore takes the method of transcribing data contained in the non-volatile storage medium 1 so as to be recorded into the optical storage medium 2 as an exemplification to illustrate the present invention, actually the reader module 10 (memory card connector slot) and the recording module 20 (compact disc recorder) are both equipped with the functions of data recording and data reading. And by adding the firmware capable of transcribing the data as represented within the file system used in the optical storage medium 2 into the data as represented within the file system used in the non-volatile storage medium 1, the portable transcription device 5 according to the present invention is also capable of transcribing the data contained in the optical storage medium into the data as represented within the file system used in the non-volatile storage medium, and thereby the portable transcription device can act as a two-way data backup utility device.

Figure 6:
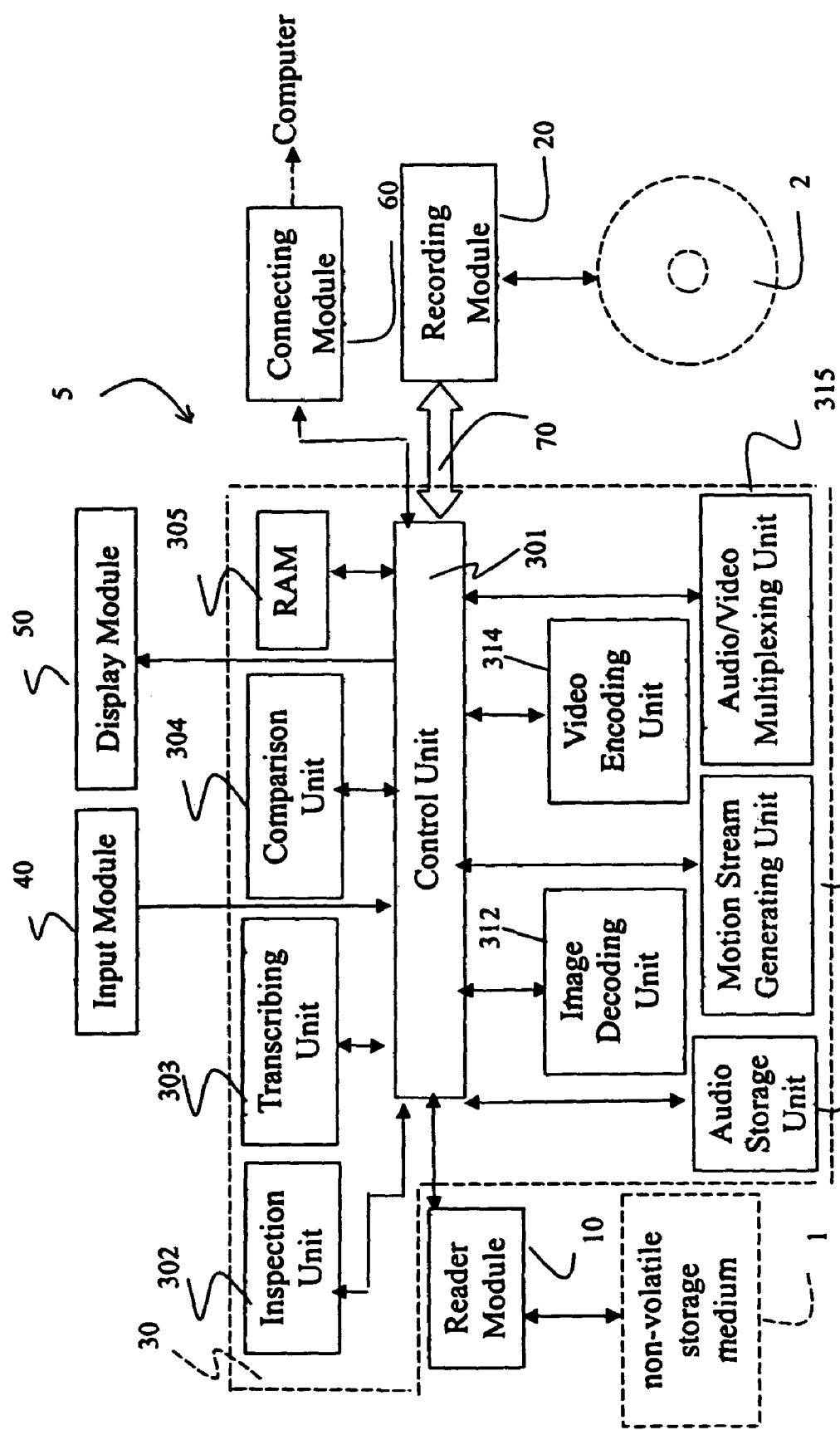
FIG. 6 is a block diagram illustrating the portable transcription device according to a second embodiment of the present invention.

FIG. 6 is a block diagram illustrating the portable transcription device according to a second embodiment of the present invention. The second embodiment of the present invention allows users to create a video disc 2 using still image files contained in the non-volatile storage medium, such as a Memory Stick, flash memory card, or any other type of memory module. In order to create a video disc ready for playback, the trascription device 5 further comprises a audio storage unit 312 for storing audio files, and image decoding unit 312 for decoding encoded images, a motion stream generating unit 313 for creating video transitions, an video encoding unit 314 for encoding MPEG files, and an audio/video multiplexing unit 315 for multiplexing audio and video sources to generate MPEG stream ready for recording, each of which being coupled to the control unit 301. Still image files can be in the format of JPEG, TIFF, or other image formats. Video formats include MPEG 1 and MPEG 2 for use in a VCD, SVCD, and DVD. For burning a VCD, the video encoding unit 314 could be a MPEG 1 encoder; and for SVCD and DVD, the video encoding unit 314 could be a MPEG 2 encoder. In one embodiment, the image decoding unit 312, the motion stream generating unit 313, the video encoding unit 314, and the audio/video multiplexing unit 315, are programming codes.

Figure 7:
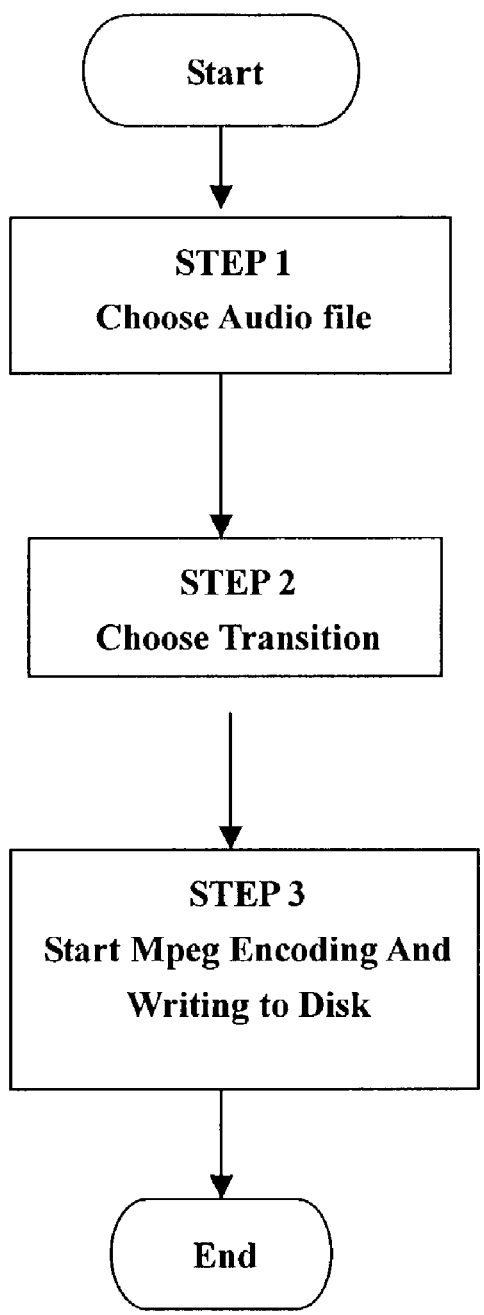
FIG. 7 and FIG. 8 are flowchart diagrams illustrating the procedural steps of using the portable transcription device of FIG. 6 to record video discs.
Figure 8:
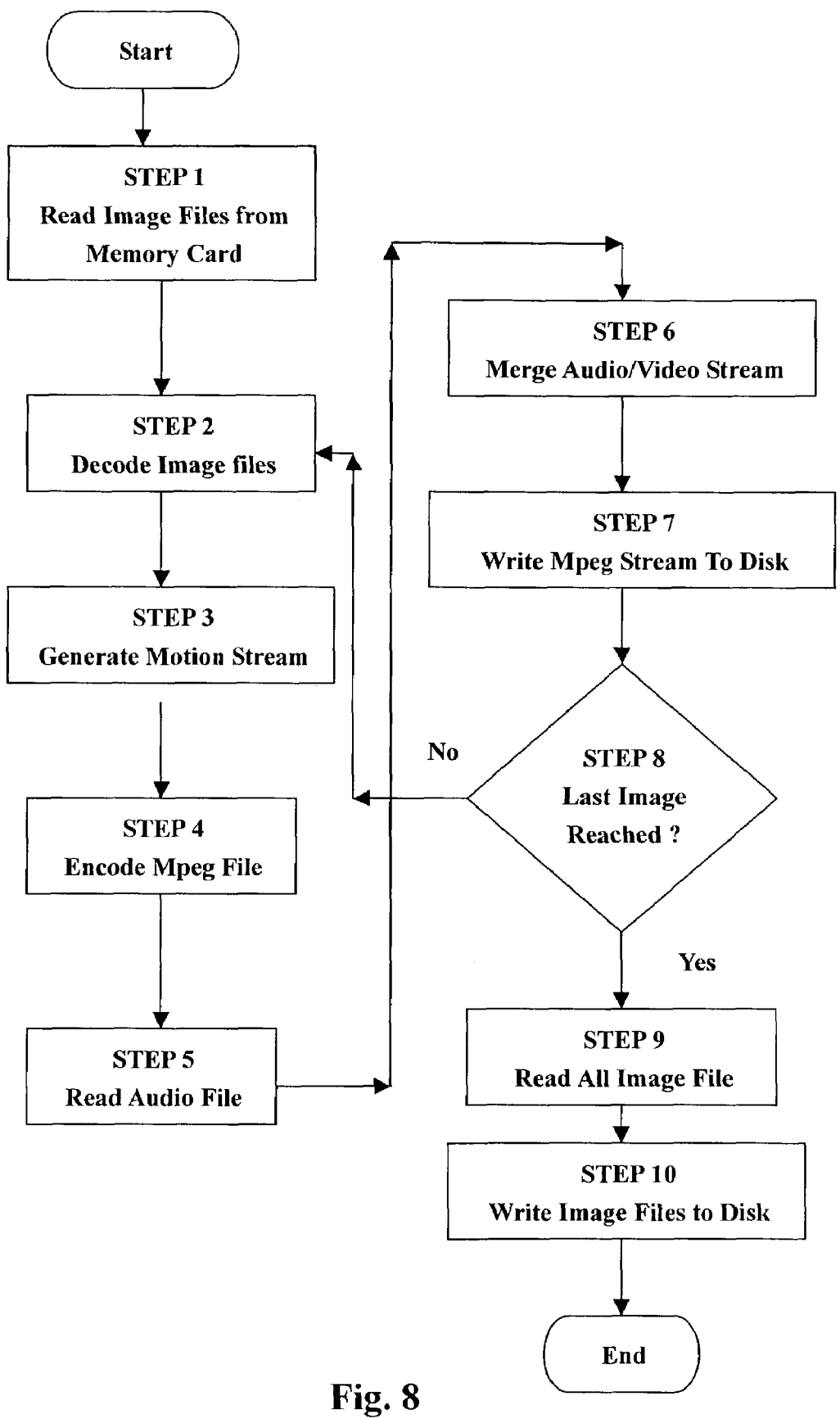

FIG. 7 and FIG. 8 are flowchart diagrams illustrating the procedural steps of using the portable transcription device of FIG. 6 to create video discs. Firstly, in FIG. 7, the user chooses in step 1 one or more audio files stored in the audio storage unit 311, which can be a ROM, through the operation of the input module 40 and display module 50. The display module 50 can be a small display showing the audio files available using numeric and alphabetic characters, and users manipulate the input module 40 to browse and select one or more of audio files that can be .wav, .aif, or .Mp3 files readable by the audio/video multiplexing unit 315. Selected audio files are used to add sound tracks to the video disc 2. By selecting more audio files to accompany the animated images, users can produce audio/video effects that are more entertaining. These audio files are preloaded in the audio storage unit 311. If the audio storage unit 311 is a ROM, these audio files do not subject to any modification. In one embodiment, the audio storage unit 311 is itself a non-volatile storage module, such as a MMC card or a SD card, which can be slotted into the reader module 10 and be replaced in the same way as the non-volatile storage medium 1. In another embodiment, the audio files are stored in the non-volatile storage medium 1 along with image files. Such embodiments allow users to use any preferred music files by storing music files in a memory module and plug into the portable prescription device 5. When users deselect all audio files or when audio files are not available, the discs to be created will have only video tracks.

After choosing the audio files to be used in the sound track, in step 2 users choose one or more transitions to be incorporated in the video, again using the input module 40 and display module 50. Because raw data are still image files, to generate motion effects requires that two adjacent images be combined or merged in a digital manner. Typical transitions includes fade-in, fade-out, overlap, scale-down and push etc. For example, when a push-from-right transition is chosen to be dropped between a first image and a second image, the second image will appear visually to push the first image out of a display screen from the right of the screen. In the present embodiment, the transition selections include transition time for each transition type, and the time span for each still images.

Finally, when audio files and video transitions are selected and decided, in step 4 users start the actual encoding and writing process of the portable transcription device to burn the video disc 2. In a preferred embodiment, a default combination of audio files and video transitions is set so that users simply depress one single key of the input module 40 to start the encoding and burning process.

FIG. 8 illustrates the procedures involved in the encoding of video and audio files and writing to disc. In step 1, the control unit 301 fetches image files contained in the memory card 1 via reader module 10 once an user has inserted the memory card 1 into the transcription device 5 and cliks start. For the reason that at least two images must be ready before applying transition effects, the control unit 301 will preferably read two images at a time. In step 2, the images read from memory card 1 will be decoded or decompressed by the image decoding unit 312 into YUV format. In decoding JPEG images, the standard of CCITT T.81 specification and ISO/IEC 10918-1 specification is followed. For TIFF images, TIFF 6.0 specification is adhered to. Note that in this step a scaling of image size is also performed. This is necessary because the size of the still images in the memory card 1 may not conform to that of the video format adopted by conventional TV set or display systems used to display the content of the video disc 2 to be created. In the case of NTSC, the image pixels should be scaled to 352*240 for VCD, and 720*480 pixels for SVCD and DVD.

In step 3, motion stream generating unit 313 digitally mixes and combine two YUV images to produce motion stream according to the transition types by default or selected by the user. The application of transitions produces a series of frames, each in YUV format. In producing visual transitions, the number of frames per second should be as specified by the video format adopted.

In step 4, these transitional frames, along with two original still images, are encoded into MPEG compliant video stream by video encoding unit 314. For MPEG 1 encoding, the standard of ISO/IEC 11172-2 specification is followed. For MPEG 2, ISO/IEC 13818-2 specification is adhered to.

In step 5, the control unit 301 reads audio files by default or selected by the user from the audio storage unit 311. In step 6 the audio/video multiplexing unit 315 multiplexes or merges the audio files of the audio storage unit 311, and the ouput of the video encoding unit 314, to create header files and audio/video pack out of which a complete MPEG stream can be generated. In packing, the ISO/IEC 11172-1 specification is followed for VCD, SJ/T 11196-1998 specification for SVCD, and ISO/IEC 13818-1 specification for DVD.

In step 7, the MPEG stream is written to the disc to create a video disc 2. The standards that are incorporated may include Video CD Specification Version 1.1/2.0, Specification for Super VCD system SJ/T 11196-1998 and DVD Specifications for Read-Only Disk, DVD Specifications for Recordable Disc (DVD-R), DVD Specifications for Rewritable Disc (DVD_RAM), DVD Specifications for Re-recordable Disc (DVD-RW) & DVD Specifications for DVD-RAM/DVD-RW/DVD-R for General Discs. For details, please refer to webpage http://www.dvdforum.org/techdvd-book.htm.

The control unit 301 takes full control of the reading, decoding, encoding, and writing-to-disc procedures described above. Initially image files stored in the memory card 1 can be retrieved and temporarily kept in the RAM 305. But for most of the time the RAM space will not be large enough to hold all image files the memory card 1 supplies. Therefore, for continued encoding and writing to disc, image files should be retrieved from memory card 1 without any time delay. In step 8, a judgement is made by the control unit 301 to determine whether all image files has been encoded into MPEG video, and whether the last image file has been reached. If not, the rest of the image files will be timely retrieved and taken by the motion stream generating unit 313, video encoding unit 314 and audio/video multiplexing unit 315 for MPEG video encoding. In one embodiment, the control unit 301 determines the quantity of image files available in the memory card 1 before embarking the above mentioned encoding procedures. In another embodiment, the control unit 301 monitors the MPEG encoding process and keeps new image files ready for encoding. In any event, the control unit 301 ensures that all image files are ready for encoding, and terminates the encoding and writing-to-disc procedures once the last image is reached.

While all image files are converted into MPEG video stream and the video disc 2 has been created, the transcription device 5 will initiate backup function in step 9 and step 10 by writing all image files from memory card 1 into the video disc 2. The control unit 301 may reread all image files from the memory card 1, create a photo directory according to either UDF for DVD or ISO9660 for VCD/SVCD, copy all files into the photo directory, and finally write into disc 2. In backing up images a write-a-session recording is used, which would make the video disc 2 a multi-session disc ready for playback on a typical video disc player, and also ready for computer use, such as file search, file rename, and file edit. In one embodiment, the transcription device 5 is configurable, either by default or user selection, to optionaly perform the backup function in burning a video disc.

In summary, the portable transcription device of the present invention utilizes the embedded transcribing unit 303 to transcribe data among different file system, and thus the data contained in the first storage medium can be so transcribed as to be recorded in the second storage medium. This extraordinary characteristic enables the portable transcription device of the present invention to operate independently of any computer system and backup data without effort. The first storage medium can be reused iteratively, which even can act as a two-way data backup utility device. More advantageously, the arrangement of the connecting module 60 enables the portable transcription device of the present invention to connect with a computer system and attain a multi-in-one peripheral device, so that the objects of the present invention can be achieved without doubt.

In addition, the portable transcription device of the present invention allows quick and easy creation of video discs from image files and simultaneous file backup using a simple click, thereby avoiding inconveniences in using a computer.

Although the present invention has been described and illustrated in detail, it is to be clearly understood that the same is by the way of illustration and example only and is not to be taken by way of limitation, the spirit and scope of the present invention being limited only by the terms of the appended claims.

What is claimed is:

1. A portable transcription device comprising:
   a reader module for reading data from a first storage medium;
   a control module coupled to the reader module for transcribing the data as represented by a file system used in the first storage medium into that as represented by a file system used in a second storage medium, wherein the file system used in the first storage medium is different from the file system used in the second storage medium;
   a recording module controlled by the control module for recording the transcribed data generated by the control module into the second storage medium; and
   a comparison unit being accessible from the microprocessor for comparing the transcribed data with the data read from the first storage medium by the reader module.

2. A portable transcription device comprising:
   a reader module for reading data from a first optical storage medium;
   a control module coupled to the reader module for transcribing the data as represented by a file system used in the first storage medium into that as represented by a file system used in a second optical medium;
   a recording module controlled by the control module for recording the transcribed data generated by the control module into the second optical storage medium, wherein a data storage format of the first optical medium is different from that of the second optical storage medium; and
   a comparison unit being accessible from the microprocessor for comparing the transcribed data with the data read from the first optical storage medium by the reader module.

3. A portable device comprising:
   a reader for reading data contained in a non-volatile storage medium having a first file system;
   an optical recorder for writing data onto an optical storage medium having a second file system other than the first file system;
   a controller coupled with the reader and the recorder for controlling the reading and writing;
   a transcribing unit coupled with the controller for transcribing data between the first file system and the second file system;
   an user interface coupled with the controller for operating the portable device according to user manipulation;
   an image decoder coupled with the controller for decoding images,
   a motion stream generator coupled with the controller for generating a motion stream, wherein the motion stream are generated by applying at least one visual transition among images decoded by the image decoder;
   a video encoder coupled with the controller for encoding the motion stream generated by the motion stream generator into a video stream;
   a audio/video multiplexer coupled with the controller for multiplexing the video stream of the video encoder and an audio source to generate a MPEG stream for writing into an optical storage medium by the optical recorder; and
   a casing enclosing the reader, the optical recorder, the controller, the transcribing unit, the image decoder, the motion stream generator, the video encoder, and the audio/video multiplexer, the casing having a first opening at one end for receiving a non-volatile storage medium in the reader, and a second opening at another end for receiving an optical storage medium in the optical recorder, wherein the user interface is disposed on a surface of the casing;
   wherein the reader, the optical recorder, the controller, the image decoder, the motion stream generator, the video encoder, and the audio/video multiplexer, operate to record a video disc in response to a single action through the user interface.

4. The portable device according to claim 3, further comprising a storage unit coupled with the controller for storing at least one audio file for use by the audio/video multiplexer.

5. The portable device according to claim 4, wherein the storage unit is a non-volatile storage medium received by the reader.

6. The portable device according to claim 4, wherein the controller controls a selection of the at least one audio file used by the audio/video multiplexer according to user selection through the user interface.

7. The portable device according to claim 3, wherein the controller controls a selection of the at least one transition used by the motion stream generator according to user selection through the user interface.

8. The portable device according to claim 3, further comprising a connector coupled with the controller for connecting, and transferring data between, the portable device and a host computer.

9. The portable device of claim 3, further comprising a comparison unit being accessible from the controller for checking data transcribed by the transcribing unit between the first file system and the second file system.

10. A method for recording a video disc ready for playback using the portable device of claim 3, comprising the steps of:
    inserting a non-volatile memory medium containing a plurality of image files into the reader;
    inserting an optical storage medium into the optical recorder;
    starting the operations of the reader, the optical recorder, the controller, the transcribing unit, the image decoder, the motion stream generator, the video encoder, and the audio/video multiplexer, to record a video disc by a single action through the user interface.

11. The method of claim 10, further comprising:
    selecting a selection of audio file among the at least one audio file for the audio/video multiplexer through the user interface.

12. The method of claim 10, further comprising:
    selecting a selection of transition among the at least one transition for the motion stream generator through the user interface.

13. The method of claim 10, further comprising:
enabling the reader, the optical recorder, the controller, and the transcribing unit, so as to record in a session of the video disc a backup of a plurality of image files from the reader.

14. A method for recording a video disc ready for playback using the portable device of claim 5, comprising the steps of:
inserting a non-volatile storage medium containing a plurality of image files into the reader;
inserting a non-volatile storage medium containing at least one audio file into the reader;
inserting an optical storage medium into the optical recorder;
starting the operations of the reader, the optical recorder, the controller, the transcribing unit, the image decoder, the motion stream generator, the video encoder, and the audio/video multiplexer, to record a video disc by a single action through the user interface.

15. The method of claim 14, further comprising:
selecting a selection of audio file among the at least one audio file for the audio/video multiplexer through the user interface.

16. The method of claim 14, further comprising:
selecting a selection of transition among the at least one transition for the motion stream generator through the user interface.

17. The method of claim 14, further comprising:
enabling the reader, the optical recorder, the controller, the transcribing unit, so as to record in a session of the video disc a backup of a plurality of image files from the reader.

18. A method for recording a video disc, comprising:
providing a reader for reading a plurality of image files contained in a non-volatile storage medium having a first file system;
providing an optical recorder for writing data onto an optical storage medium having a second file system other than the first file system;
providing a controller coupled with the reader and the recorder for controlling the reading and writing;
providing a transcribing unit coupled with the controller for transcribing data between the first file system and the second file system;
providing an user interface coupled with the controller for operating the portable device according to user manipulation;
providing an image decoder coupled with the controller for decoding a plurality of image files,
providing a motion stream generator coupled with the controller for generating a motion stream, wherein the motion stream are generated by applying at least one visual transition among images decoded by the image decoder;
providing a video encoder coupled with the controller for encoding the motion stream generated by the motion stream generator into a video stream;
providing a audio/video multiplexer coupled with the controller for multiplexing the video stream of the video encoder and an audio source to generate a MPEG stream for writing into an optical storage medium by the optical recorder; and
providing a casing enclosing the reader, the optical recorder, the controller, the transcribing unit, the image decoder, the motion stream generator, the video encoder, and the audio/video multiplexer, the casing having a first opening at one end for receiving a non-volatile storage medium in the reader, and a second opening at another end for receiving an optical storage medium in the optical recorder, wherein the user interface is disposed on a surface of the casing; and
enabling the reader, the optical recorder, the controller, the transcribing unit, the image decoder, the motion stream generator, the video encoder, and the audio/video multiplexer, so as to record a video disc in response to a single action through the user interface.

19. The method of claim 18, further comprising:
providing a storage unit coupled to the controller for storing a plurality of audio files; and
selecting a selection of audio files among the plurality of audio files for the audio/video multiplexer through the user interface.

20. The method of claim 18, further comprising:
providing a non-volatile storage medium received by the reader for storing a plurality of audio files; and
selecting a selection of audio files among the plurality of audio files for the audio/video multiplexer through the user interface.

21. The method of claim 18, further comprising:
selecting a selection of transition among the at least one transition for the motion stream generator through the user interface.

22. The method of claim 18, further comprising:
enabling the reader, the optical recorder, the controller, the transcribing unit, so as to record in a session of the video disc a backup of a plurality of image files from the reader.

* * * * *